United States Patent
Maeda et al.

(10) Patent No.: US 10,683,913 B2
(45) Date of Patent: Jun. 16, 2020

(54) TENSIONER

(71) Applicant: TSUBAKIMOTO CHAIN CO., Osaka-shi, Osaka (JP)

(72) Inventors: Munehiro Maeda, Osaka (JP); Yuji Kurematsu, Osaka (JP); Osamu Yoshida, Osaka (JP); Yudai Takagi, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 276 days.

(21) Appl. No.: 15/708,672

(22) Filed: Sep. 19, 2017

(65) Prior Publication Data
US 2018/0087628 A1    Mar. 29, 2018

(30) Foreign Application Priority Data

Sep. 26, 2016    (JP) ................................ 2016-186498

(51) Int. Cl.
*F16H 7/08*        (2006.01)

(52) U.S. Cl.
CPC ......... *F16H 7/0836* (2013.01); *F16H 7/0848* (2013.01); *F16H 2007/0812* (2013.01); *F16H 2007/0859* (2013.01); *F16H 2007/0872* (2013.01); *F16H 2007/0893* (2013.01); *F16H 2007/0897* (2013.01)

(58) Field of Classification Search
CPC .................. F16H 7/0836; F16H 7/0848; F16H 2007/0812; F16H 2007/0859; F16H 2007/0872; F16H 2007/0893; F16H 2007/0897
See application file for complete search history.

(56) References Cited

U.S. PATENT DOCUMENTS

| 6,383,103 | B1 * | 5/2002 | Fujimoto | F01L 1/02 474/109 |
| 2009/0197720 | A1 | 8/2009 | Aurhammer et al. | |
| 2009/0197722 | A1 * | 8/2009 | Emizu | F16H 7/0836 474/110 |
| 2010/0222167 | A1 * | 9/2010 | Chekansky | F16H 7/0836 474/110 |

(Continued)

FOREIGN PATENT DOCUMENTS

| JP | 2009-115226 A | 5/2009 |
| JP | 2009-535569 A | 10/2009 |

(Continued)

*Primary Examiner* — Michael R Mansen
*Assistant Examiner* — Robert T Reese
(74) *Attorney, Agent, or Firm* — Westerman, Hattori, Daniels & Adrian, LLP (57) ABSTRACT

Provided is a tensioner which can ensure, with a simple structure, both the stability of the installation state of a check valve and the capacity of an oil storage chamber. A tensioner has a plunger, a housing, a check valve, and a coil spring. The plunger has a front-side plunger part having a pressing front end portion, and a rear-side plunger part disposed on the rear side of the front-side plunger part and having a valve movement restricting portion. The check valve is disposed on the rear side of the valve movement restricting portion. The coil spring is disposed so that one end thereof is in contact with a housing bottom portion and the other end thereof is in contact with the rear side of the check valve.

5 Claims, 8 Drawing Sheets (56) References Cited

U.S. PATENT DOCUMENTS

| | | |
|---|---|---|
| 2015/0267789 A1 | 9/2015 | Kurematsu et al. |
| 2016/0153530 A1 | 6/2016 | Kitamura et al. |
| 2018/0274636 A1* | 9/2018 | Watanabe ............. F16H 7/0836 |

FOREIGN PATENT DOCUMENTS

| | | | |
|---|---|---|---|
| JP | 2015183767 A | 10/2015 | |
| JP | 2016-102534 A | 6/2016 | |
| WO | WO-2009060794 A1 * | 5/2009 | ........... F16H 7/0836 |

* cited by examiner

TENSIONER

BACKGROUND OF THE INVENTION

1. Field of the Invention

The present invention relates to a tensioner that is used to apply an appropriate tension to a transmission belt or a transmission chain in an engine timing system or the like, and more particularly relates to a tensioner including an oil storage chamber that supplies oil to a pressure oil chamber.

2. Description of the Related Art

Conventionally, it has been customary to use a tensioner to hold the tension of a chain or the like. For example, it is well known to bias a tensioner lever with a tensioner in order to hold appropriately the tension in a chain guide mechanism which slidably guides by a tensioner lever a transmission chain, such as a roller chain, that is endlessly suspended between sprockets provided on a crankshaft and a camshaft in an engine room.

A known tensioner used for such a chain guide mechanism includes a plunger having a plunger hole opened to the rear side, a housing having a plunger accommodating hole opened to the front side, and a coil spring biasing the plunger toward the front side.

With such a tensioner, where oil is supplied from the outside of the housing, the pressure oil chamber formed between the plunger accommodating hole and the plunger is filled with the oil, and the plunger is biased toward the front side by the oil. A check valve prevents the oil from flowing out from an oil supply hole. This causes the oil to flow through a slight gap between the plunger and the plunger accommodating hole as the plunger reciprocates, thereby making it possible to obtain a damping effect damping the reciprocating motion of the plunger by the flow path resistance.

With such a known tensioner, where a long time elapses after the oil supply has been stopped (in the case of an engine, after the engine has been stopped), a time lag occurs in the supply of oil immediately after the next start, and even where the plunger reciprocates, the oil in the pressure oil chamber leaks, no new oil is supplied, and the oil in the pressure oil chamber runs out. As a result, the damping force produced by the oil does not act on the plunger and vibrations of the transmission chain can increase or the transmission chain can be damaged.

Figure 9:
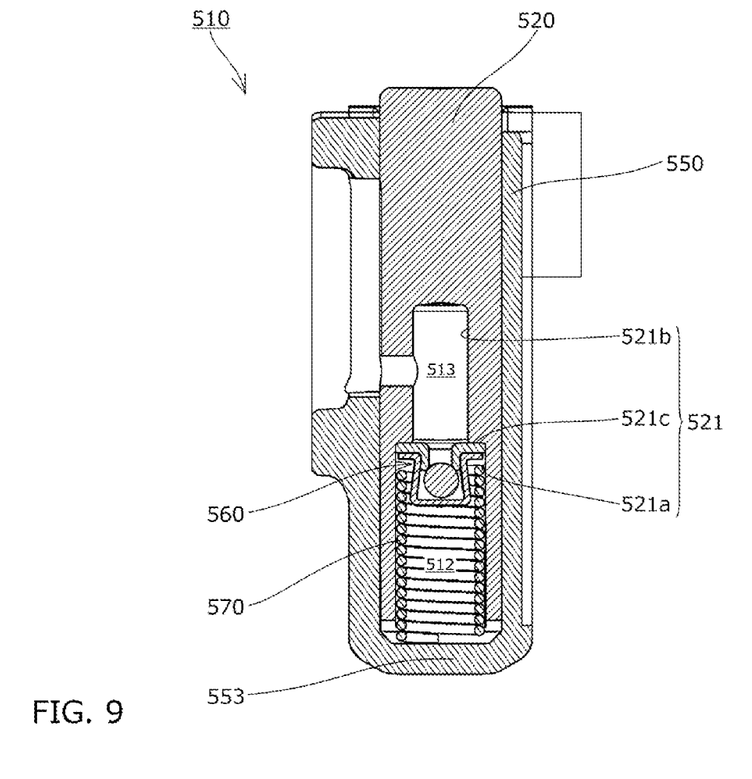
FIG. 9 is a cross-sectional view showing a conventional tensioner.

Accordingly, a tensioner 510 is known (see, for example, Japanese Patent Application Publication No. 2016-102534) in which, as shown in FIG. 9, an oil storage chamber 513 is provided inside a plunger 520, and oil is supplied from the oil storage chamber 513 to a pressure oil chamber 512. In such a structure, a certain amount of oil is retained, without leakage, inside the oil storage chamber 513, the oil remaining in the oil storage chamber 513 is supplied to the pressure oil chamber 512 even immediately after a start after a prolonged stop, and the damping force acting from the oil of the plunger 520 on the plunger is maintained, thereby suppressing vibrations of a chain and preventing the damage thereof. A check valve 560 is installed between the pressure oil chamber 512 and the oil storage chamber 513, and this check valve 560 allows the oil to flow from the oil storage chamber 513 on the front side into the pressure oil chamber 512 on the rear side and prevents the oil from flowing backward from the pressure oil chamber 512 to the oil storage chamber 513.

Figure 10:
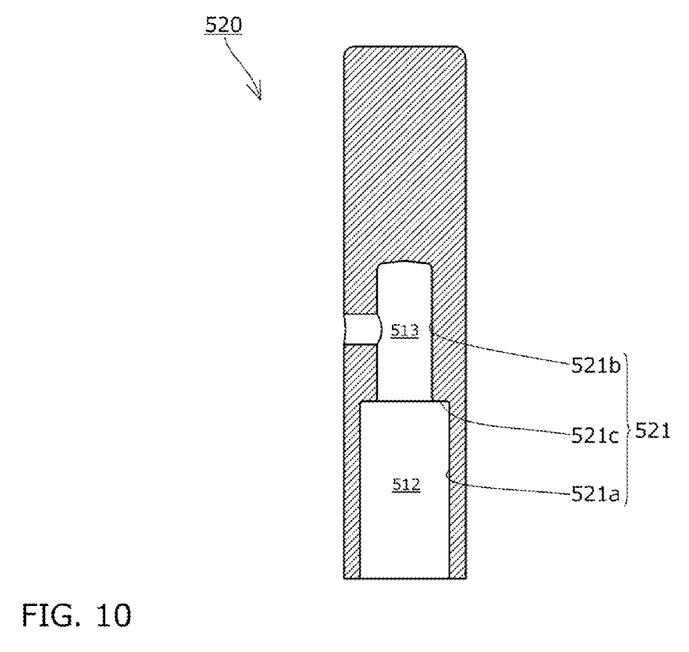
FIG. 10 is a cross-sectional view showing a conventional plunger.

In the tensioner 510 disclosed in Japanese Patent Application Publication No. 2016-102534, as shown in FIGS. 9 and 10, a rear large-diameter hole 521a and a front small-diameter hole 521b formed coaxially and continuously on the front side of the large-diameter hole 521a are formed in a plunger hole 521 which opens toward the rear side, and a check valve 560 is provided on the rear side of a stepped portion 521c formed between the large-diameter hole 521a and the small-diameter hole 521b. The check valve 560 is biased toward the front side by a coil spring 570 provided between a housing bottom portion 553 and the check valve 560, thereby biasing the plunger 520 toward the front side and fixing the check valve 560 to the rear side of the stepped portion 521c.

SUMMARY OF THE INVENTION

However, with the tensioner 510 disclosed in Japanese Patent Application Publication No. 2016-102534, the following problems occur because it is necessary to machine the large-diameter hole 521a and the small-diameter hole 521b from the rear side of the plunger 520 when the plunger 520 is manufactured, and the radial width dimension of the stepped portion 521c functioning as a valve movement restricting portion and the inner diameter of the front small-diameter hole 521b functioning as the oil storage chamber 513 are in a trade-off relationship.

Thus, where the width dimension of the stepped portion 521c functioning as the valve movement restricting portion is designed to be large in order to ensure the stability of the installation state of the check valve 560, the size of the inner diameter of the small-diameter hole 521b functioning as the oil storage chamber 513 is impaired and it is impossible to store a sufficient amount of oil in the oil storage chamber 513. Meanwhile, a problem arising when the inner diameter of the small-diameter hole 521b functioning as the oil storage chamber 513 is designed to be large in order to ensure the capacity of the oil storage chamber 513 is that the size of the width dimension of the stepped portion 521c functioning as the valve movement restricting portion is impaired and the installation state of the check valve 560 is not stabilized.

It is therefore an object of the present invention to provide a tensioner which can solve these problems and can ensure, with a simple structure, both the stability of the installation state of the check valve and the capacity of the oil storage chamber.

The present invention relates to a tensioner including: a plunger that has a plunger hole opened to a rear side; a housing that has a plunger accommodating hole opened to a front side and accommodating the plunger; a check valve that divides an internal space between the housing and the plunger into an oil storage chamber on the front side and a pressure oil chamber on the rear side, allows oil to flow into the pressure oil chamber and prevents the oil from flowing backward to the oil storage chamber; and a coil spring that biases the plunger toward the front side, wherein the plunger has a front-side plunger part having a pressing front end portion for defining a front end side of the oil storage chamber and pressing a pressing object, and a rear-side plunger part disposed on the rear side of the front-side plunger part and having a valve movement restricting portion in which a through hole passing through in a front-rear direction is formed; the check valve is disposed on the rear side of the valve movement restricting portion; and the coil spring is disposed so that one end thereof is in contact with a housing bottom portion of the housing and the other end thereof is in contact with the check valve.

According to one aspect of the present invention, the pressing front end portion that defines the front end side of the oil storage chamber and presses the pressing object, and the valve movement restricting portion that restricts the movement of the check valve to the front side are formed separately on the front-side plunger part and the rear side plunger part which are separate parts. As a result, the rear-side plunger part having the valve movement restricting part can be machined from both the front side and the rear side. Therefore, restrictions on the dimensional design between the radial width dimension of the valve movement restricting portion and the inner diameter of the oil storage chamber which are applied when the plunger is formed as a part are eliminated, the radial width dimension of the valve movement restricting portion can be designed to be large, the stability of the installation state of the check valve can be increased, and the capacity of the oil storage chamber can be increased.

According to another aspect of the present invention, the rear-side sliding cylindrical portion of the rear-side plunger part includes a first cylindrical part located further toward the front side than the valve movement restricting part, and the second cylindrical part located further toward the rear side than the valve movement restricting part, thereby making it possible to ensure a large dimension of the rear-side sliding cylindrical portion in the front-rear direction. This makes it possible to configure the outer peripheral surface on the rear side of the plunger, which strongly influences the damping effect, of the rear-side plunger part which is the same part, so that it is possible to form smoothly the outer peripheral surface on the rear side of the plunger and obtain a satisfactory damping effect.

According to another aspect of the present invention, the front-side plunger part and the rear-side plunger part each have a sliding cylindrical portion, so that the dimension of each sliding cylindrical portion of each plunger part can be shortened. Therefore, machining of each plunger part is facilitated, for example, the dig-down amount of each sliding cylindrical portion can be reduced.

According to another aspect of the present invention, since the pressing front end portion is fitted to the front end side of the first cylindrical portion, sliding against the inner peripheral surface of the plunger accommodating hole can be performed on the rear-side sliding cylindrical portion of the rear-side plunger part. Therefore, it is not necessary to impart a sliding characteristic to the front-side plunger part, and it is possible to improve the degree of freedom in designing the material of the front-side plunger part.

According to another aspect of the present invention, as a result of forming the valve movement restricting portion on the front end side of the rear-side sliding cylindrical portion, it is not necessary to form a sliding cylindrical portion on both the front side and the rear side with respect to the valve movement restricting portion of the rear-side plunger part, thereby making it possible to facilitate the machining of the rear-side plunger part.

DESCRIPTION OF THE PREFERRED EMBODIMENTS

A tensioner 10 according to a first embodiment of the present invention will be described hereinbelow with reference to the figures.

Figure 1:
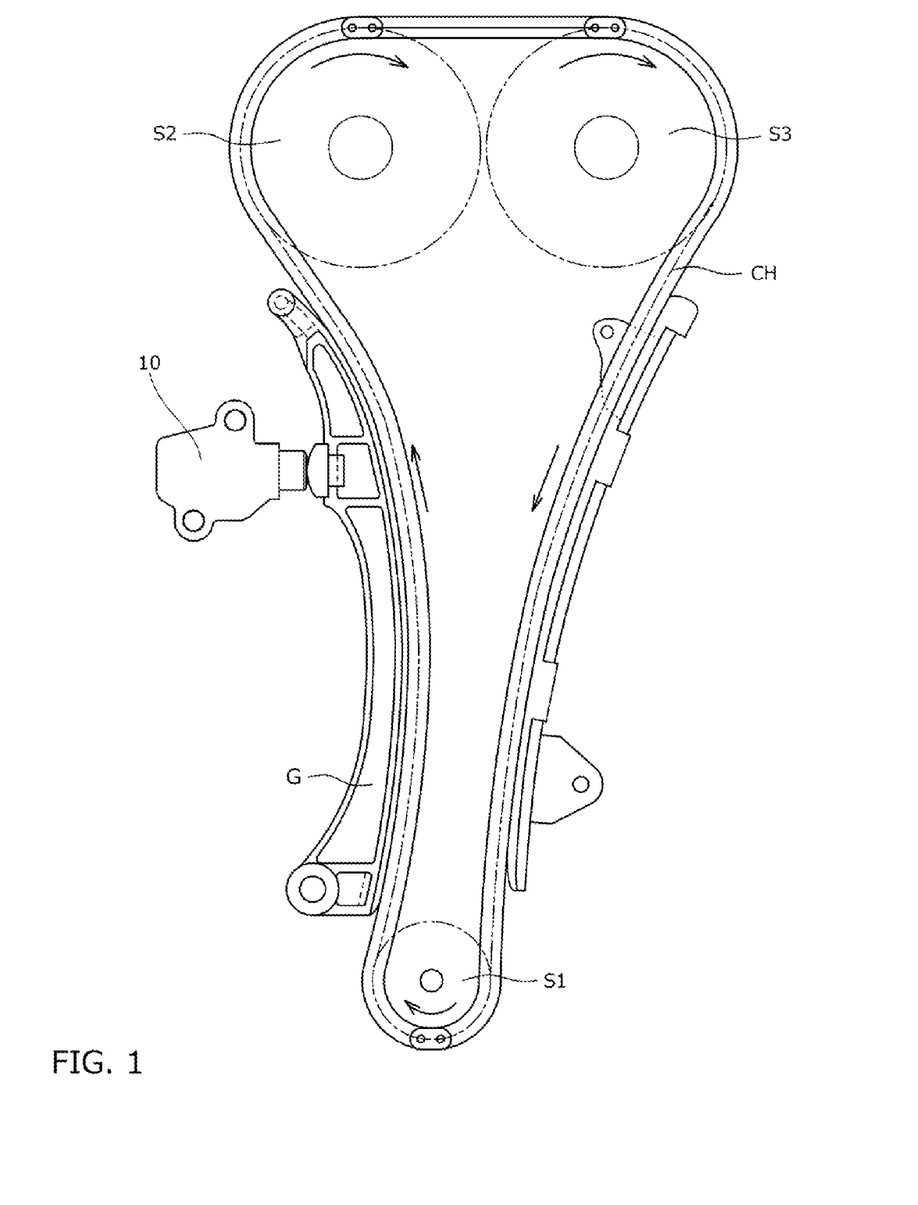
FIG. 1 is an explanatory view showing a usage mode of a tensioner according to a first embodiment of the present invention.

First, as shown in FIG. 1, a tensioner 10 is incorporated in a chain transmission device used, for example, for a timing system of an automobile engine, and is attached to an engine block (not shown in the figure). The tensioner applies, through a tensioner lever G, appropriate tension to the slack side of a transmission chain CH wound on a plurality of sprockets S1 to S3, thereby suppressing vibrations occurring when the automobile travels.

Figure 2:
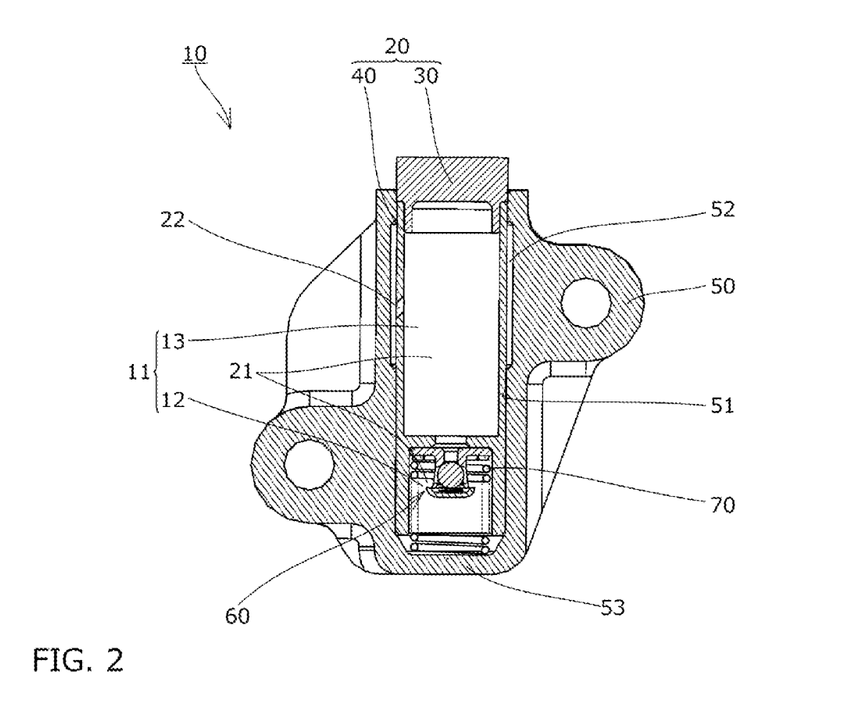
FIG. 2 is a cross-sectional view showing the tensioner according to the first embodiment.

As shown in FIG. 2, the tensioner 10 includes a plunger 20 having a plunger hole 21 opened to the rear side, a housing 50 having a plunger accommodating hole 51 opened to the front side and accommodating the plunger 20, a check valve 60 that allows oil to flow from an oil storage chamber 13 on the front side, which is formed in an internal space 11 between the housing 50 and the plunger 20, into a pressure oil chamber 12 on the rear side, and prevents oil from flowing backward from the pressure oil chamber 12 to the oil storage chamber 13, and a coil spring 70 that biases the plunger 20 toward the front side.

Figure 3:
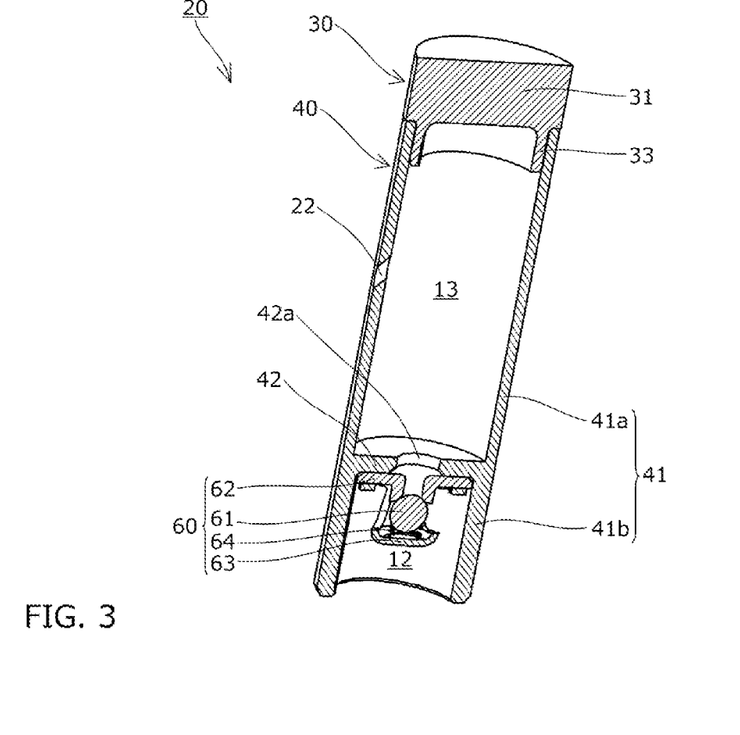
FIG. 3 is a perspective view showing a plunger fitted with a check valve.
Figure 4:
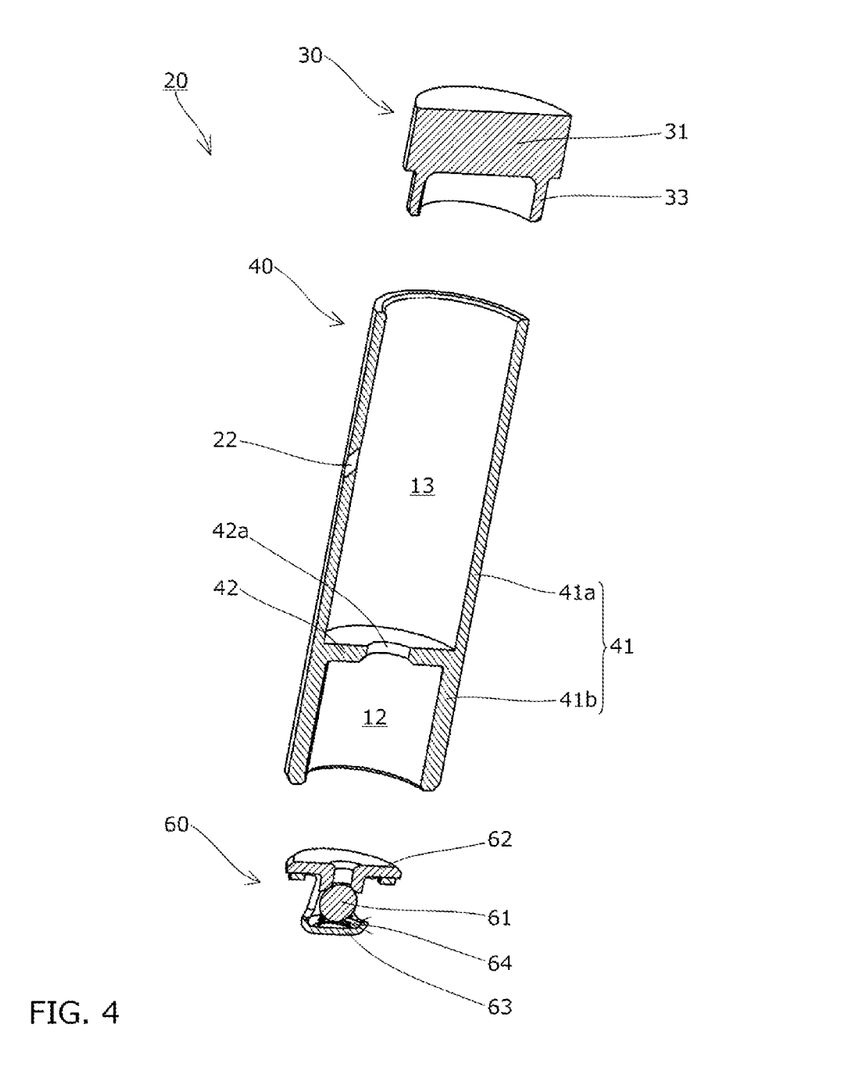
FIG. 4 is an exploded perspective view showing a plunger and a check valve.

As shown in FIGS. 3 and 4, the plunger 20 is composed of a front-side plunger part 30 disposed on the front side and a rear-side plunger part 40 disposed on the rear side of the front-side plunger part 30. The front-side plunger part 30 and the rear-side plunger part 40 are made of a metal such as iron or the like.

As shown in FIGS. 3 and 4, the front-side plunger part 30 is disposed on the front end side of the plunger 20 and has a pressing front end portion 31 for defining the front end side of the oil storage chamber 13 and pressing a pressing object such as the tensioner lever G or the like, and an annular fitting protruding portion 33 formed to protrude toward the rear side from the bottom surface of the pressing front end portion 31.

As shown in FIGS. 3 and 4, the rear-side plunger part 40 has a cylinder-shaped rear-side sliding cylindrical portion 41 slidably disposed on the inner peripheral surface of the plunger accommodating hole 51, a disk-shaped valve movement restricting portion 42 which is formed so as to protrude from the inner peripheral surface of the rear-side sliding cylindrical portion 41 to the inner peripheral side and restricts the movement of the check valve 60 to the front side, and a round through hole 42a which is formed in the center portion of the valve movement restricting portion 42 and passes through in the front-rear direction.

As shown in FIGS. 3 and 4, the rear-side sliding cylindrical portion 41 has a first cylindrical portion 41a located further toward the front side than the valve movement restricting portion 42, and a second cylindrical portion 41b located further toward the rear side than the valve movement restricting portion 42. A plunger through hole 22 is formed in the first cylindrical portion 41a to pass from the outer peripheral side to the inner peripheral side thereof.

Further, as shown in FIGS. 3 and 4, the outer peripheral surface of the pressing front end portion 31 and the outer peripheral surface of the rear-side sliding cylindrical portion 41 are formed to be flush with each other. The outer diameter dimensions of the pressing front end portion 31 and the rear-side sliding cylindrical portion 41 are set such that the outer peripheral surface of the pressing front end portion 31 is positioned further toward the inner peripheral side than the outer peripheral surface of the rear-side sliding cylindrical portion 41. In this case, it is possible to lower the requirement for the machining accuracy of the outer peripheral surface of the pressing front end portion 31.

In the first embodiment, as shown in FIGS. 3 and 4, the fitting protruding portion 33 is press-fitted to the inner periphery of the front end of the first cylindrical portion 41a so that the front-side plunger part 30 and the rear-side plunger part 40 are connected so that the relative movement thereof in the front-rear direction and the circumferential direction is restricted.

Further, the space on the inner side of the front-side plunger part 30 and the rear-side plunger part 40, which are connected to each other, functions as the plunger hole 21 described hereinabove.

As shown in FIG. 2, the housing 50 includes the plunger accommodating hole 51, a housing oil supply hole (not shown in the figure) for supplying oil from the outside of the housing 50 into the plunger accommodating hole 51, a communication adjusting groove 52 which is formed in the inner peripheral wall of the plunger accommodating hole 51 and serves for communicating the housing oil supply hole (not shown in the figure) and the plunger through hole 22, and a housing bottom portion 53 located on the rear side of the plunger accommodating hole 51.

As shown in FIGS. 2 and 3, the check valve 60 is disposed on the rear side of the valve movement restricting portion 42 to partition the pressure oil chamber 12 and the oil storage chamber 13, allows oil to flow into the pressure oil chamber 12 and prevents oil from flowing backward to the oil storage chamber 13.

As shown in FIG. 3, the check valve 60 includes a check ball 61, a ball seat 62 having a seating portion on which the check ball 61 is seated, a retainer 63 that guides the check ball 61, and a ball spring 64 that is disposed between the check ball 61 and the retainer 63 and biases the check ball 61 toward the seating portion of the ball seat 62.

As shown in FIG. 2, the coil spring 70 is retractably accommodated in the pressure oil chamber 12, more specifically, disposed so that one end of the coil spring is in contact with the housing bottom portion 53 and the other end of the coil spring is in contact with the rear side of the check valve 60 (retainer 63). As a result, the plunger 20 is biased toward the front side, and the check valve 60 is pressed and fixed to the rear side of the valve movement restricting portion 42.

In such a tensioner 10, the housing oil supply hole (not shown in the figures), the communication adjusting groove 52, and the plunger through hole 22 function as a supply path for supplying oil from the outside of the housing 50 to the oil storage chamber 13.

Further, the communication adjusting groove 52 may be formed in at least one of the outer peripheral wall of the plunger 20 (in the present embodiment, the first cylindrical portion 41a) and the inner peripheral wall of the plunger accommodating hole 51.

Next, the tensioner 10 according to a second embodiment of the present invention will be described with reference to FIG. 5. Here, in the second embodiment, the configuration other than the plunger 20 is exactly the same as in the first embodiment described above. Therefore, the description of the configuration other than the plunger 20 will be omitted.

Further, explanation of parts of the plunger 20 which are configured in the same manner as in the first embodiment will be omitted.

Figure 5:
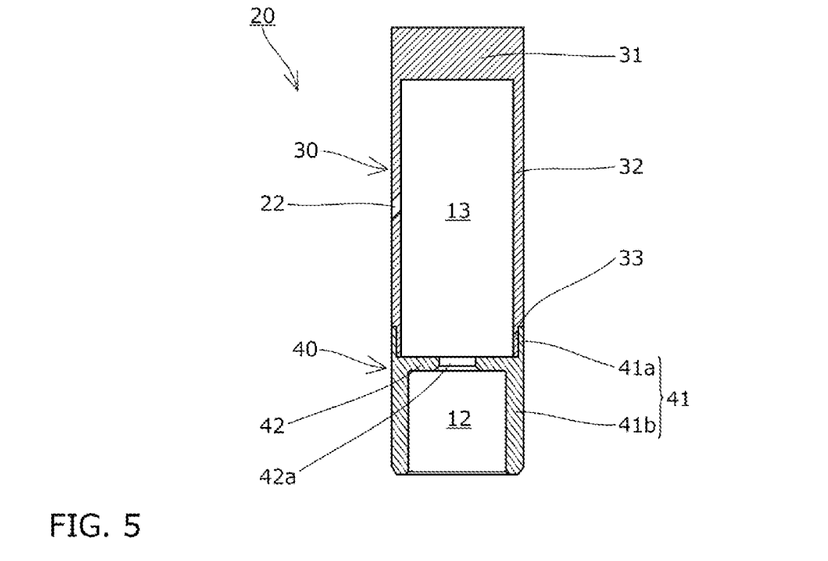
FIG. 5 is a sectional view showing a plunger according to a second embodiment.

In the second embodiment, as shown in FIG. 5, the front-side plunger part 30 has the pressing front end portion 31, the front-side sliding cylindrical portion 32 which is formed so as to protrude from the rear surface of the pressing front end portion 31 toward the rear side and is slidably disposed on the inner peripheral surface of the plunger accommodating hole 51, and an annular fitting protruding portion 33 formed to protrude from the rear surface of the front-side sliding cylindrical portion 32 toward the rear side.

Further, in the second embodiment, the plunger through hole 22 passing through from the outer peripheral side to the inner peripheral side is formed in the front-side sliding cylindrical portion 32.

Further, as shown in FIG. 5, the outer peripheral surfaces of the pressing front end portion 31 and the front-side sliding cylindrical portion 32 are formed flush with the outer peripheral surface of the rear-side sliding cylindrical portion 41. The outer diameter dimensions of the pressing front end portion 31, the front-side sliding cylindrical portion 32, and the rear-side sliding cylindrical portion 41 may be set so that the outer peripheral surfaces of the pressing front end portion 31 and the front-side sliding cylindrical portion 32 are located further toward the inner peripheral side than the outer peripheral surface of the rear-side sliding cylindrical portion 41. In this case, it is possible to reduce the requirement for the machining accuracy of the outer peripheral surfaces of the pressing front end portion 31 and the front-side sliding cylindrical portion 32.

In the second embodiment, as shown in FIG. 5, as a result of press-fitting the fitting protruding portion 33 to the inner periphery of the first cylindrical portion 41a of the rear-side sliding cylindrical portion 41, the front-side plunger part 30 and the rear-side plunger part 40 are connected so that the relative movement in the front-rear direction and circumferential direction is restricted.

Next, the tensioner 10 according to a third embodiment of the present invention will be described with reference to FIG. 6. Here, in the third embodiment, the configuration other than the plunger 20 is exactly the same as in the second embodiment described above. Therefore, the description of the configuration other than the plunger 20 will be omitted. Further, concerning the plunger 20, in the third embodiment, only the connection structure between the front-side plunger part 30 and the rear-side plunger part 40 is different from the second embodiment, so only the difference will be described hereinbelow.

Figure 6:
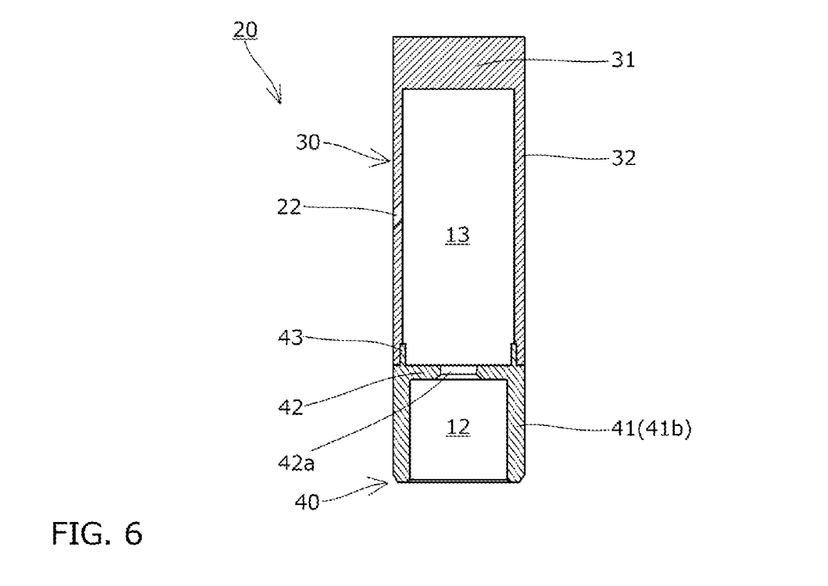
FIG. 6 is a cross-sectional view showing a plunger according to a third embodiment.

First, in the third embodiment, as shown in FIG. 6, the fitting protruding portion 33 is not formed at the front-side plunger part 30.

Further, the first cylindrical portion 41a is not formed at the rear-side sliding cylindrical portion 41 of the rear-side plunger part 40, and an annular fitting protruding portion 43 formed to protrude from the front surface of the rear-side sliding cylindrical portion 41 toward the front side is formed at the rear-side plunger part 40.

Further, as shown in FIG. 6, the outer peripheral surfaces of the pressing front end portion 31 and the front-side sliding cylindrical portion 32 are formed flush with the outer peripheral surface of the rear-side sliding cylindrical portion 41. The outer diameter dimensions of the pressing front end portion 31, the front-side sliding cylindrical portion 32, and the rear-side sliding cylindrical portion 41 may be set so that the outer peripheral surfaces of the pressing front end portion 31 and the front-side sliding cylindrical portion 32 are located further toward the inner peripheral side than the outer peripheral surface of the rear-side sliding cylindrical portion 41. In this case, it is possible to reduce the requirement for the machining accuracy of the outer peripheral surfaces of the pressing front end portion 31 and the front-side sliding cylindrical portion 32.

In the third embodiment, as shown in FIG. 6, as a result of press-fitting the fitting protruding portion 43 to the inner periphery of the rear end of the front-side sliding cylindrical portion 32, the front-side plunger part 30 and the rear-side plunger part 40 are connected so that the relative movement in the front-rear direction and circumferential direction is restricted.

Next, the tensioner 10 according to a fourth embodiment of the present invention will be described with reference to FIG. 7. Here, in the fourth embodiment, the configuration other than the plunger 20 is exactly the same as in the second embodiment described above. Therefore, the description of the configuration other than the plunger 20 will be omitted. Further, concerning the plunger 20, in the fourth embodiment, only the connection structure between the front-side plunger part 30 and the rear-side plunger part 40 is different from the second embodiment, so only the difference will be described hereinbelow.

Figure 7:
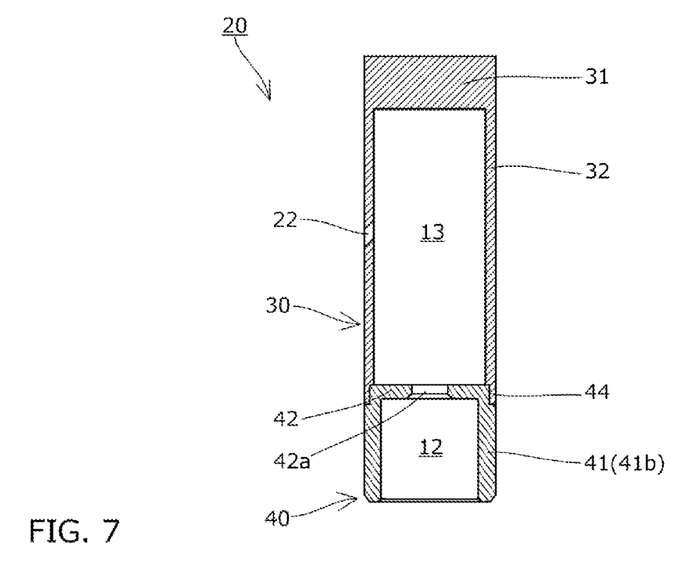
FIG. 7 is a cross-sectional view showing a plunger according to a fourth embodiment.

First, in the fourth embodiment, as shown in FIG. 7, the fitting protruding portion 33 is not formed at the front-side plunger part 30.

Further, the first cylindrical portion 41a is not formed at the rear-side sliding cylindrical portion 41 of the rear-side plunger part 40, and an annular groove portion 44 is formed on the outer peripheral surface of the front end of the rear-side sliding cylindrical portion 41.

Further, as shown in FIG. 7, the outer peripheral surfaces of the pressing front end portion 31 and the front-side sliding cylindrical portion 32 are formed flush with the outer peripheral surface of the rear-side sliding cylindrical portion 41. The outer diameter dimensions of the pressing front end portion 31, the front-side sliding cylindrical portion 32, and the rear-side sliding cylindrical portion 41 may be set so that the outer peripheral surfaces of the pressing front end portion 31 and the front-side sliding cylindrical portion 32 are located further toward the inner peripheral side than the outer peripheral surface of the rear-side sliding cylindrical portion 41. In this case, it is possible to reduce the requirement for the machining accuracy of the outer peripheral surfaces of the pressing front end portion 31 and the front-side sliding cylindrical portion 32.

In the fourth embodiment, as shown in FIG. 7, as a result of press-fitting the front end portion of the rear-side sliding cylindrical portion 41 to the inner periphery of the rear end of the front-side sliding cylindrical portion 32, the front-side plunger part 30 and the rear-side plunger part 40 are connected so that the relative movement in the front-rear direction and circumferential direction is restricted.

Next, a tensioner 10 according to a fifth embodiment of the present invention will be described with reference to FIG. 8. Here, in the fifth embodiment, the configuration other than the plunger 20 is exactly the same as in the first embodiment described above. Therefore, the description of the configuration other than the plunger 20 will be omitted. Further, concerning the plunger 20, in the fifth embodiment, only the connection structure between the front-side plunger part 30 and the rear-side plunger part 40 is different from the first embodiment, so only the difference will be described hereinbelow.

Figure 8:
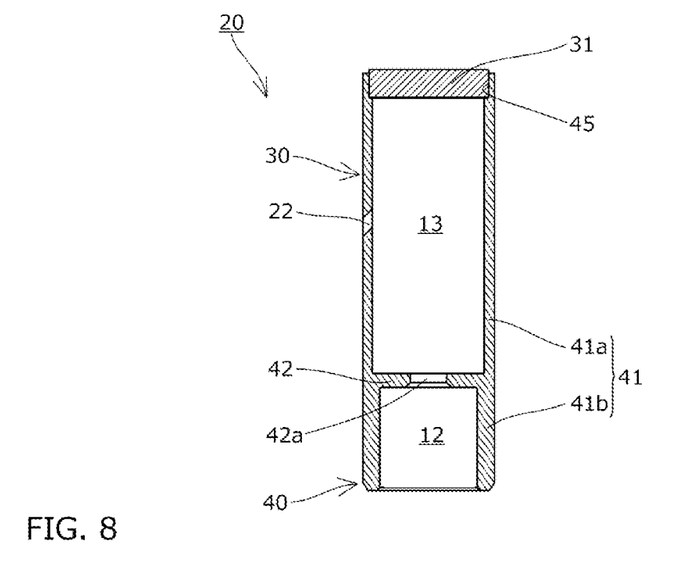
FIG. 8 is a cross-sectional view showing a plunger according to a fifth embodiment.

First, in the fifth embodiment, as shown in FIG. 8, the fitting protruding portion 33 is not formed on the front-side plunger part 30.

Further, an annular groove portion 45 is formed on the inner peripheral surface of the front end of the first cylindrical portion 41a of the rear-side sliding cylindrical portion 41.

In this embodiment, the front surface of the pressing front end portion 31 is disposed further toward the front side than the front surface of the rear-side sliding cylindrical portion 41, but the front surface of the pressing front end portion 31 and the front surface of the rear-side sliding cylindrical portion 41 may be formed to be flush with each other.

In the fifth embodiment, as shown in FIG. 8, as a result of press-fitting the pressing front end portion 31 of the front-side plunger part 30 to the inner periphery of the annular groove portion 45 of the rear-side sliding cylindrical portion 41, the front-side plunger part 30 and the rear-side plunger part 40 are connected so that the relative movement in the front-rear direction and circumferential direction is restricted.

The embodiments of the present invention are described in detail hereinabove, but the present invention is not limited to the embodiments, and various design changes can be made without departing from the present invention as set forth in the claims.

For example, the tensioner may be configured by arbitrarily combining the configurations of the above-described plurality of embodiments.

Further, in the above-described embodiments, the tensioner is described as being incorporated in the timing system for an automobile engine, but the specific usage of the tensioner is not limited thereto.

In the above-described embodiments, the tensioner is described as applying the tension to the transmission chain through the tensioner lever. However, it is also possible to directly slidingly guide the transmission chain with the tip of the plunger to apply the tension to the transmission chain.

Furthermore, the present invention is not limited to the transmission mechanism using the transmission chain, and may be applied to a similar transmission mechanism such as a belt and a rope, and can be used in various industrial fields as long as it is required to apply tension to a long object.

Further, in the above-described embodiments, the housing accommodating the plunger is described as being a so-called tensioner body attached to an engine block or the like.

However, the specific form of the housing is not limited to that described hereinabove, and the housing may be a cylindrical so-called sleeve which is inserted into the body hole formed in a tensioner body.

Further, in the above-described embodiment, the spring for biasing the check ball toward the seat portion of the ball seat is used, but this spring is not an indispensable constituent member and may not be provided depending on the embodiment.

In the explanation of above-described embodiments, the check ball is seated on the seating portion of the ball seat. However, the check ball may be directly seated on the peripheral edge of the through hole of the valve movement restricting portion, without providing the ball seat.

Further, in the explanation of above-described embodiments, the front-side plunger part and the rear-side plunger part are connected by press-fitting a portion on the rear side of the front-side plunger part and a portion on the front side of the rear-side plunger part, but a method for connecting the front-side plunger part and the rear-side plunger part is not limited to the press-fitting. Thus, any method such as loose fitting or engagement may be used as long as it is possible to restrict the relative movement of the front-side plunger part and the rear-side plunger part in the front-rear direction and circumferential direction.

Further, in the explanation of part of above-described embodiments, the fitting protruding portion formed on the front-side plunger part or the rear-side plunger part is formed to be annular. However, a specific form of the fitting protruding portion is not limited to the annular form. Thus, the fitting protruding portion of any form may be used as long as fitting to the other plunger part is enabled. For example, the fitting protruding part may be divided into a plurality of portions in the circumferential direction.

What is claimed is:

1. A tensioner comprising:
    a plunger that has a plunger hole opened to a rear side;
    a housing that has a plunger accommodating hole opened to a front side and accommodating the plunger;
    a check valve that divides an internal space between the housing and the plunger into an oil storage chamber on the front side and a pressure oil chamber on the rear side, allows oil to flow into the pressure oil chamber and prevents the oil from flowing backward to the oil storage chamber; and
    a coil spring that biases the plunger toward the front side;
    wherein the plunger has a front-side plunger part having a pressing front end portion for defining a front end side of the oil storage chamber and pressing a pressing object, and a rear-side plunger part disposed on the rear side of the front-side plunger part;
    wherein the front-side plunger part and the rear-side plunger part are formed separately;
    wherein the rear-side plunger part has a rear-side sliding cylindrical portion slidably disposed on an inner peripheral surface of the plunger accommodating hole, and a valve movement restricting portion in which a through hole passing through in a front-rear direction is formed;
    wherein the rear-side sliding cylindrical portion has a first cylindrical portion located further toward the front side than the valve movement restricting portion, and a second cylindrical portion located further toward the rear side than the valve movement restricting portion;
    wherein a plunger through hole is formed in the first cylindrical portion of the rear-side sliding cylindrical portion to pass from the outer peripheral side to the inner peripheral side thereof;
    wherein the valve movement restricting portion is formed so as to protrude radially inwardly relative to an inner peripheral surface of the first cylindrical portion and so as to protrude radially inwardly relative to an inner peripheral surface of the second cylindrical portion;
    the front-side plunger part is fitted to a front end side of the first cylindrical portion;
    wherein the check valve is disposed on the rear side of the valve movement restricting portion; and
    wherein the coil spring is disposed so that one end thereof is in contact with a housing bottom portion of the housing and the other end thereof is in contact with the check valve.

2. The tensioner according to claim 1, wherein
    the front-side plunger part has a front-side sliding cylindrical portion formed to protrude from a rear surface of the pressing front end portion toward the rear side and disposed slidably on an inner peripheral surface of the plunger accommodating hole; and
    a rear end of the front-side sliding cylindrical portion is fitted to the front end side of the first cylindrical portion.

3. The tensioner according to claim 1, wherein the pressing front end portion is fitted to the front end side of the first cylindrical portion.

4. The tensioner according to claim 1, wherein
    the front-side plunger part has a front-side sliding cylindrical portion formed to protrude from a rear surface of the pressing front end portion toward the rear side and disposed slidably on an inner peripheral surface of the plunger accommodating hole; and
    a rear end of the front-side sliding cylindrical portion is fitted to the front end side of the rear-side sliding cylindrical portion.

5. The tensioner according to claim 1, wherein
    the front-side plunger part has an annular fitting protruding portion formed to protrude toward the rear side from the bottom surface of the pressing front end portion; and
    the annular fitting protruding portion is press-fitted to the inner periphery of the front end of the first cylindrical portion.

* * * * *